United States Patent Office 2,884,405
Patented Apr. 28, 1959

2,884,405

NICKEL SALTS OF DIALKYL DITHIOPHOSPHORIC ACID AND BUTADIENE-STYRENE

Paul M. Downey, Gainesville, Fla., assignor to Monsanto Chemical Company, St. Louis, Mo., a corporation of Delaware No Drawing. Application June 17, 1957
Serial No. 666,240

4 Claims. (Cl. 260—45.75)

This invention relates to a new anti-exposure cracking agent and to sulfur-vulcanizable rubber-like synthetic polymers containing same.

One of the major problems of the rubber industry is the protection of sulfur-vulcanizable rubber-like synthetic polymers against exposure cracking, that is degradation due to ozone while under either static or dynamic stress. The problem is a serious one, particularly with respect to the service life of rubber tires and is aggravated by the fact that in general chemical antioxidants have little or no value in protecting the rubber-like polymers against deterioration by ozone. Although many materials have been suggested, such as the various waxes, factice, cellulose and the like to prevent ozone from reaching the polymer surface, not one has been found entirely satisfactory. Accordingly, rubber technologists have constantly sought improvements.

In accordance with this invention it has been found that nickel salts of dialkyl dithiophosphoric acids are highly effective anti-exposure cracking agents for sulfur-vulcanizable rubber-like synthetic polymers of aliphatic conjugated diene compounds. The dialkyl dithiophosphoric acids, nickel salts of which constitute the anti-exposure cracking agents of this invention, are represented by the structure

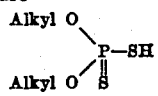

Examples are the nickel salt of dimethyl dithiophosphoric acid, the nickel salt of diethyl dithiophosphoric acid, the nickel salt of dibutyl dithiophosphoric acid, the nickel salt of diisobutyl dithiophosphoric acid, the nickel salt of diisoamyl dithiophosphoric acid and preferably the nickel salt of diisopropyl dithiophosphoric acid which latter has the structure

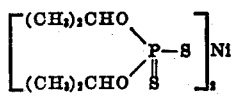

The alkyl groups may be replaced by alicyclic groups, as for example cyclohexyl and methylcyclohexyl.

The nickel salts of this invention are particularly useful in the control of exposure cracking of the sulfur-vulcanizable synthetic rubber-like materials prepared by the polymerization of an aliphatic conjugated diene compound or with other unsaturated compounds copolymerizable therewith. The synthetic rubbers which may be substantially improved in ozone resistance are polymers of butadiene, isoprene, piperylene, dimethylbutadiene, ethyl butadiene and the like as the major component of a copolymer with monoolefinic compounds which contain the $CH_2=C<$ group such as the vinyl aromatics, namely styrene, α-methyl styrene, nuclear substituted styrenes, monochlorstyrene, dichlorstyrene, vinyl naphthalene, vinyl biphenyl, vinyl carbazole, 2-vinyl-5-ethyl pyridine, etc., and such vinyl compounds as acrylonitrile, methacrylonitrile, acrylic acid, methacrylic acid, methyl vinyl ketone, and the like but particularly hydrocarbon rubbers.

As illustrative of the control of exposure cracking of vulcanized sulfur-vulcanizable synthetic rubber-like materials, a rubbery butadiene-1,3-styrene copolymer composition is prepared utilizing the following ingredients:

| Stock | A | B |
|---|---|---|
| | Parts by weight | |
| GR-S 100 | 100 | 100 |
| Carbon black | 50 | 50 |
| Saturated hydrocarbon softener | 10 | 10 |
| Zinc oxide | 4 | 4 |
| Stearic acid | 2 | 2 |
| Sulfur | 1.75 | 1.75 |
| N-Cyclohexyl-2-benzothiazolesulfenamide | 1.2 | 1.2 |
| Nickel salt of diisopropyl dithiophosphoric acid | | 3.0 |

The ingredients are admixed on a rubber mill in the customary fashion and the respective compounded stocks are cured in a press at 144° C. for 30 minutes. Since evaluation under static conditions is not indicative of the service obtained with many types of rubber articles which must withstand flexing, the vulcanized compositions are evaluated under dynamic conditions in an atmosphere containing a definite concentration of ozone. Samples of the stocks are cured in the form of a belt ½" wide, ¼" thick and 5⁵⁄₁₆" in diameter and mounted on 1" diameter shafts. The ozone concentration is maintained at 20–30 parts per hundred million throughout the test and the shafts are rotated at 75 r.p.m. In this manner a momentary elongation through a range of 0–20% is provided at any portion of the test specimen passing over the shaft. (The apparatus and procedure employed is described by Creed et al. in Analytical Chemistry, vol. 25, page 241, February 1953.) The experimental test specimens are compared visually at various intervals noting the extent of cracking. A stock which is severely cracked has no service life remaining in terms of the useful life of a rubber article and where the cracking is designated as extremely severe, the degradation is well beyond even this point. The results of the tests are set forth below:

Table I

| Stock | Surface Cracking after Flexing in Ozone for— | | | | | |
|---|---|---|---|---|---|---|
| | 8 hrs. | 24 hrs. | 48 hrs. | 96 hrs. | 144 hrs. | 168 hrs. |
| A | very slight. | extremely severe. | extremely severe. | extremely severe. | extremely severe. | extremely severe. |
| B | none | none | none | none | none | very slight. |

As further illustrative of the invention samples of butadiene-styrene copolymer containing the nickel salt of O,O-diethyl dithiophosphoric acid are cured and exposed to ozone in the manner described. The surface condition after exposure is compared to previously selected standards according to the severity of the cracking, the standards having been assigned rating numbers as follows:

Rating number:      Description of cracking
1      No cracking.
2      Very slight cracking.
3      Slight cracking.
4      Moderate cracking.
5      Severe cracking.
6      Extremely severe cracking.

Rating numbers are assigned to the experimental stocks by comparing them to the standards. Employing base stock A described above and another stock comprising base stock A to which has been added 1.5 parts by weight of nickel diethyl dithiophosphate, resistance to ozone is demonstrated by comparing the effect of exposure to ozone. It is convenient to express the results numerically by plotting the rating numbers in inverse order on a vertical axis against time of exposure to ozone on the horizontal axis, calculating the areas under the curves and dividing the area under the curve for the experimental stock by the area under the curve for the base stock alone and multiplying by 100. The results of this calculation after exposing the stocks until the base stock is severely cracking to a rating of 6 are as follows:

Table II

| Material added to base stock: | Ozone effectiveness |
|---|---|
| None | 100 |
| Nickel diethyl dithiophosphate | 161 |

In another embodiment of the invention butadiene-styrene copolymer rubber latex (GR–S 1500 latex containing 23.5% bound styrene, no stabilizer, 19.9% solids) is coagulated, washed and carefully dried. To the dry rubber so obtained 1 part and 2 parts respectively of nickel O,O-dicyclohexyl dithiophosphate are added followed by compounding and curing ingredients. A similar composition is prepared without the nickel salt, the finished compositions comprising

| Stock | C | D | E |
|---|---|---|---|
| | Parts by weight | | |
| Rubber from GR–S 1500 latex | 100 | 100 | 100 |
| Carbon black | 50 | 50 | 50 |
| Saturated hydrocarbon softener | 10 | 10 | 10 |
| Zinc oxide | 4 | 4 | 4 |
| Stearic acid | 2 | 2 | 2 |
| Sulfur | 1.75 | 1.75 | 1.75 |
| N-Cyclohexyl-2-benzothiazolesulfenamide | 1.2 | 1.2 | 1.2 |
| Nickel O,O-dicyclohexyl dithiophosphate | | 1.0 | 2.0 |

The stocks are cured for 60 minutes at 144° C. in the form of belts and exposed to ozone all substantially as described. After 24 hours exposure the stock containing 2 parts of the nickel O,O-dicyclohexyl dithiophosphate exhibits no cracking whatsoever and while the stock containing 1 part thereof exhibits very slight cracking, it is significantly superior to the base stock alone.

As further illustrative of sulfur vulcanizable rubber-like compositions exhibiting improved resistance to exposure cracking are compositions of rubbery copolymers of butadiene-1,3 and acrylonitrile (e.g. Hycar OR-15), an example being

| | Parts by weight |
|---|---|
| Butadiene-acrylonitrile | 100 |
| Carbon black | 60 |
| Zinc oxide | 5 |
| Stearic acid | 1 |
| Sulfur | 1.5 |
| 2,2'-dithiobis benzothiazole | 1.5 |
| Nickel salt of diisopropyl dithiophosphoric acid | 2.0 |

It is obvious from the foregoing that the nickel salts of this invention substantially increase the life of synthetic rubber goods. They inhibit the deterioration of synthetic rubbery diolefin polymers and copolymers resulting from weathering. The various causes of deterioration include in addition to ozone, oxygen, moisture and light. The new adjuvants disperse readily and rapidly in the various types of synthetic rubber stocks. They may be incorporated into the rubber by milling or similar procedure or added to the rubber in the form of latex before coagulation or applied to the surface of a mass of crude or vulcanized rubber.

Smaller amounts of the new anti-exposure cracking agents may be employed than those indicated in the examples. Amounts as small as 0.2% by weight on the rubber of the new anti-exposure cracking agents of this invention exhibit significant anti-exposure cracking properties. Amounts higher than those specifically shown, as for example up to 5% by weight on the rubber, may be employed depending upon the nature of the rubber-like synthetic polymer, the other compounding ingredients used and the objectives of the compounder.

By the term "sulfur-vulcanizable synthetic rubber-like polymer" as employed in the appended claims, unless otherwise modified, is meant synthetic rubbers which are capable of vulcanization when heated with sulfur and includes latices and reclaims of such materials. The nickel salts inhibit exposure cracking of natural rubber but nickel causes undesirable secondary effects in this polymer.

It is to be understood that other desired filling and compounding ingredients may be incorporated in the rubber base along with the anti-exposure cracking agent. For example, there may be incorporated other accelerators, softeners, etc., as well as the customary rubber antioxidants.

It is intended to cover all changes and modifications of the examples of the invention herein chosen for purposes of disclosure which do not constitute departures from the spirit and scope of the invention.

This application is a continuation-in-part of copending application Serial No. 335,988, filed February 9, 1953, now abandoned.

What is claimed is:

1. A composition of matter comprising a sulfur-vulcanizable synthetic rubber-like polymer, said polymer being prepared by the polymerization of a butadiene-1,3 hydrocarbon and styrene copolymerizable therewith and 0.2–5% of the nickel salt of a dialkyl dithiophosphoric acid possessing the structure

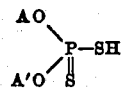

where A and A' represent alkyl groups containing less than six carbon atoms.

2. A composition of matter comprising a vulcanized sulfur-vulcanizable synthetic rubber-like polymer, said polymer being prepared by the polymerization of a butadiene-1,3 hydrocarbon and styrene copolymerizable therewith, and, as an anti-exposure cracking agent therefor, 0.2–5% of the nickel salt of a dialkyl dithiophosphoric acid possessing the structure

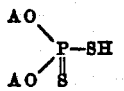

where A represents an alkyl group containing less than six carbon atoms.

3. A composition of matter comprising a vulcanized sulfur-vulcanizable synthetic rubber-like polymer, said polymer being prepared by the polymerization of a butadiene-1,3 hydrocarbon and styrene copolymerizable therewith, and, as an anti-exposure cracking agent therefor, 0.2–5% of the nickel salt of diisopropyl dithiophosphoric acid.

4. A composition of matter comprising a sulfur-vulcanizable synthetic rubber-like polymer, said polymer being prepared by the polymerization of a butadiene-1,3 hydrocarbon and styrene copolymerizable therewith and 0.2–5% of the nickel salt of diethyl dithiophosphoric acid.

References Cited in the file of this patent

UNITED STATES PATENTS

| 2,369,632 | Cook et al. | Feb. 13, 1945 |
| 2,552,570 | McNab et al. | May 15, 1951 |
| 2,739,123 | Kennerly | Mar. 20, 1956 |